P. H. THOMAS.
SYSTEM OF CAR OPERATION BY VAPOR CONVERTERS.
APPLICATION FILED AUG. 27, 1915.
1,188,580.
Patented June 27, 1916.
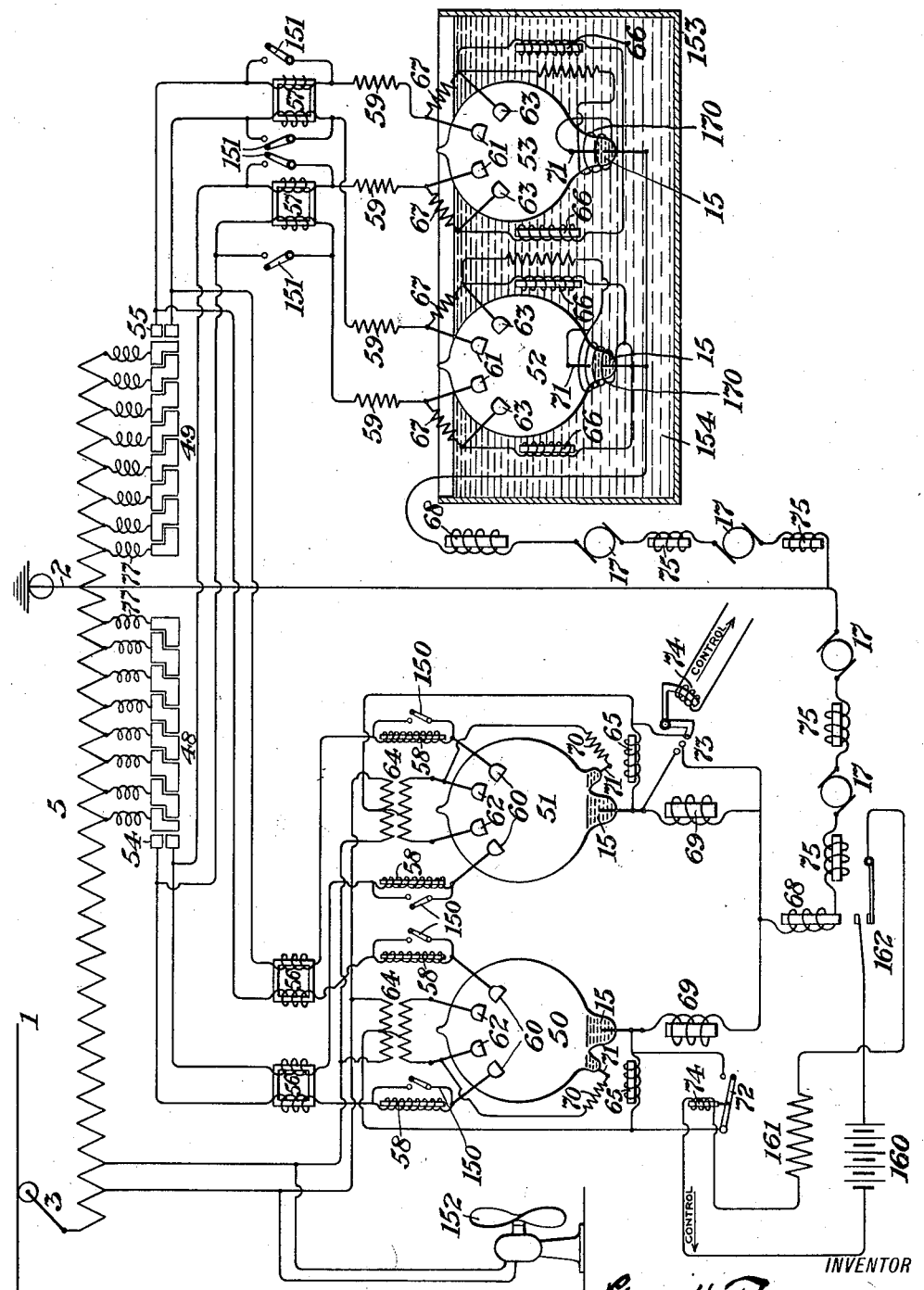
INVENTOR
Percy H. Thomas
BY
Charles A. Terry
ATTORNEY

UNITED STATES PATENT OFFICE.

PERCY H. THOMAS, OF UPPER MONTCLAIR, NEW JERSEY, ASSIGNOR TO COOPER HEWITT ELECTRIC COMPANY, OF HOBOKEN, NEW JERSEY, A CORPORATION OF NEW JERSEY.

SYSTEM OF CAR OPERATION BY VAPOR-CONVERTERS.

1,188,580.   Specification of Letters Patent.   Patented June 27, 1916.

Original application filed August 2, 1905, Serial No. 272,352. Divided and this application filed August 27, 1915. Serial No. 47,599.

*To all whom it may concern:*

Be it known that I, PERCY H. THOMAS, a citizen of the United States, and resident of Upper Montclair, county of Essex, State of New Jersey, have invented certain new and useful Improvements in Systems of Car Operation by Vapor-Converters, of which the following is a specification.

The present invention relates to the application of vapor converters to systems involving the operation of moving cars from an alternating current supply main.

The invention contemplates employing a single converter or two or more converters in parallel, with direct current motors in multiple or in series. The vapor converters and the regulating and starting apparatus therefor, together with the transformer used for getting the middle point may be in some instances mounted on a single car; or such devices may be mounted on each of a number of cars forming part of a train.

The regulating and starting features of the apparatus are important. A number of methods of starting the converters are illustrated in the drawing and in some of them no method of starting has been shown. It is not attempted to show all possible methods of starting, but any of those known in the art are applicable and may be applied.

The drawing illustrates an organization of circuits for operating and controlling a system of direct current motors of considerable capacity having vapor converters interposed in the system at a suitable point or points. I have illustrated cooling means applied to the converters, such means consisting in one case of an electric fan operated from the alternating current side of the circuit and in another case of a tank containing glycerin and water, or other cooling liquid, in which the converters are immersed. It will be understood that similar cooling means may be utilized in connection with converters comprised in any of the systems of circuits disclosed herein.

The single figure of the drawing shows diagrammatically several forms of starting devices, one of which is the subject of the present invention. The source of power in this instance is a circuit including a trolley wire, 1, and a ground or metallic return, 2. In the drawing the ground return is illustrated.

The source 2 assumed for the system disclosed in the drawing is a single-phase source of energy. The trolley arm is shown at 3 leading to one terminal of an auto-transformer, 5, different points of which are connected to the contact-bars, 48, 48, and 49, 49. Converters, 50, 51, 52 and 53 are connected through their several positive electrodes, 60, 60, and 61, 61, to the auto-transformer 5, as will presently be described, and through their negative electrodes, 15, 15, 15, 15, to the motors, 17, 17, whose field coils are shown at 75, 75. The means of connection between the respective positive electrodes and the auto-transformer are the contact-bars, 48 and 49, and suitable sliding blocks, 54, 54, and 55, 55, arranged in pairs and adapted to operate in opposite directions upon the two groups of contact-bars. It will be seen that the members of each pair of blocks are connected by suitable circuit wires to the positive electrodes of the converters and since said blocks are capable of being brought into contact successively with the contact-bars 48 and 49, varying voltages may be applied to the positive electrodes, as will be readily understood.

The blocks 54 and 55 are shown as being just off the extreme high voltage position. It is to be assumed that originally the two sets of blocks are near each other and inside the inner end of the rows of contact-bars 48 and 49, respectively. The blocks are connected to the several positive electrodes through impedances 56, 56 and 57, 57, and through inductances 58, 58, 58, 58, or resistances 59, 59, 59, 59, as clearly shown upon the drawing. These impedances serve for purposes of regulation and also to prevent short-circuiting between the positive electrodes. That is, starting with the contact blocks 54 and 55 on the first position nearest the ground connection 2, which is the starting condition for the motors, we have the corresponding right hand main electrodes 60 and 61 in the bulbs 50, 51, 52, and 53 all connected in parallel to the first tap on the right hand in the auto-transformer 5. Similarly, with the left hand main-electrodes 60 and 61 which are then connected to the coresponding lowest tap on the left of the ground connection 2; the negative electrodes 15 of the converters are connected through the motors to be an intermediate point of the auto-transformer 5. In this case evidently a low voltage is impressed upon the system. Assuming now the contacts to be moved one position outward, the two blocks 55 will be in contact with different taps, namely, the first and second taps on the right, and the two blocks 54 will be connected to the first and second taps on the left hand side. The voltage upon the motors is thus increased while no short-circuit has been produced between the consecutive taps on the auto-transformer 5, as each block is so arranged and operated as not to touch two contact-bars at the same time. When moved to the next position all right hand main electrodes 60 and 61 are in parallel as before, as are all left hand electrodes 60 and 61. The next step raises the voltage one tap higher as before and so on throughout the full range of operation. Evidently, the direct current voltage impressed upon the motors has been increased step by step, thus causing their acceleration. The suddenness of the transfer of current from step to step is lessened by the impedances 77 connected in the taps of the auto-transformer as well as by the other impedances and resistances in the circuit. Furthermore, the inductances 56 and 57 which include two coils, each in the circuit to a converter, and a common core, tend to equalize the flow of current between the converters when wound in the proper direction, since a rising current in one coil magnetizes the core in such a way as to cause an electro-motive-force in the other coil in such a direction as to pass current therethrough in the same direction as in the first coil. This action evidently facilitates the parallel operation of the converters as well as cushioning the steps of voltage between the taps of the transformer 5. At times it may be desirable to dispense with the coils 56, 57 or other coils such as 58, 59, which may be done, as indicated by the short-circuiting switches 151 and 150, or any other suitable manner. The impedances 68 and 69 serve the same functions as the impedances 47 in Fig. 1. In the converters 50 and 51 the starting electrodes 71 are connected through resistances 70 to supplementary positives 62. These serve for starting purposes as is well known in the art, namely by allowing current to flow from the alternating source upon the connection of the electrodes 15 and 71 by motion of the container or otherwise and by the breaking down of the negative electrode resistance on the separation of these electrodes while current is still flowing. In converters 52 and 53, the same separation of a starting electrode and a negative electrode 15 is accomplished by a magnet coil 170 connected either between a positive electrode as 63 and a starting electrode, as 71, or between a starting electrode, 71, and the negative electrode 15. In the former case (that is, when the magnet coil 170 is connected between a positive electrode and a starting electrode) the electrodes 71 and 15 are normally in contact, as shown in converter 53, having been connected upon the cessation of operation of the starting circuit on the last action and are drawn out of contact, while carrying current, by the magnet coil 170. In the latter case, (that is, when the coil 170 is connected between a starting electrode and the negative electrode) the starting and negative electrodes 71 and 15 are normally out of contact, as shown in converter 52, and are drawn into contact by the magnet coil 170 upon the application of voltage and are released from contact by the short-circuiting of the magnet coil which results from this connection.

Referring again to impedances 56 and 57 it is evident that these devices facilitate the parallel operation of the converters by causing a tendency for equal currents to flow in the parallel converters as, for example, the converters 52 and 53. They serve as well to limit short-circuiting in the converters. Impedances 58 and 59 serve controlling, sustaining and short-circuiting functions. Any of these devices may be dispensed with where found desirable.

It will be seen that supplemental positive electrodes, 62, 62, in the converters 50 and 51, are connected to transformer secondaries, 64, the corresponding primaries of which are supplied from the auto-transformer 5. An intermediate point of each primary is connected through a choke coil, 65, with the lead to the negative electrode 15 of the corresponding converter. The object of this construction is to assist in keeping the converter in operation during periods of low voltage.

The arrangement in connection with converters 52 and 53 is somewhat different. Here choke-coils, 66, 66, 66, 66, are employed in connection with resistances 67, 67, both these sets of devices being connected with the main electrodes 61, 61 and also with the supplemental electrodes, 63, 63, in said converters.

For stopping the operation of the converters 50 and 51 control magnets 74 are provided, which may be energized by closing a suitable electric circuit by hand or automatically as, for example, by means of the current flowing through the system. The magnets 74 act on switches 72 and 73, which serve to short circuit the sustaining coils 65, and 65 and 69 of their respective converters. Evidently with the sustaining coils short-circuited, no energy will be stored in them and they will not serve the function of keeping the negative electrode alive during low points of supply voltage and the converters will, in general, cease to operate. This operation is shown clearly in the drawings where 160 is a storage battery or other source of electro-motive-force; 161 a controlling resistance, and 162 a magnetic cut-out, energized by the coil 68, the whole serving as an automatic means for stopping the operation of the converter 50 when the current in 68 is sufficiently great to energize the coils 68 which can be set at any desired value. Evidently, upon the closing of the cut-out 162, the battery 160 passes current through the cut-out 162, the resistance 161, and the magnet coil 74, which operates to close the short-circuiting switch 72.

The various leads from the auto-transformer 5 to the contact-bars 48 and 49 are provided with impedances 77 to prevent jerky acceleration. These impedances tend to limit the momentary flow of current as the contact-blocks 54 and 55 pass to new positions, as already described above.

The cooling means already referred to in the form of a fan operated from the alternating current side of the circuit are shown at 152; while the other cooling means described above are illustrated at the right as a tank, 153, containing a liquid, 154, which may be any suitable cooling liquid such as glycerin and water, for example. Such artificial cooling serves very useful purposes. For example, it is found in operation of converters, such as are contemplated in this invention, that cooling very much reduces the tendency to the short-circuiting between the positive electrodes and, further, the forced lowering of the temperature allows a larger value of current to be passed through the converter without overheating, which is very desirable in some cases, since it allows of smaller size apparatus for the same capacity.

This application is a division of my application Serial Number 272,352, filed August 2nd, 1905.

I claim as my invention:

1. In a mercury vapor apparatus, the combination with an exhausted container, electrodes therein, one of which is a cathode, and an auxiliary electrode therein movable to contact with said cathode, of a solenoid connected between a starting electrode and the main negative electrode and adapted to move said movable electrode into contact with said cathode.

2. In a system of electrical distribution, an alternating supply, a vapor device comprising an exhausted container, main electrodes therein, one of which is a cathode, and a movable electrode therein, in combination with a coil connected between a starting electrode and the main negative electrode and energized from said supply operating upon said movable electrode to make a contact with said cathode.

3. In a system of electrical distribution, an alternating supply, a vapor device comprising an exhausted container, main electrodes therein, one of which is a cathode, and a movable electrode therein, in combination with a solenoid connected between a starting electrode and the main negative electrode and operating on said movable electrode connected between the lead of said movable electrode and the lead of said cathode.

4. In a system of electrical distribution, the combination with a vapor device comprising an exhausted container, main anodes and a main cathode therein, and a movable electrode also therein, of a source of alternating current connected to said anodes, a resistance connected between the source and the lead of the movable electrode, a solenoid operating upon the movable electrode to make a contact with the cathode connected between the lead of said movable electrode and the lead of said cathode, and means for returning current from the cathode to the source.

5. In a system of electrical distribution, the combination with an exhausted container, main anodes and a main cathode therein, and an auxiliary electrode therein movable to contact with said cathode, of an electric supply for said device and means for causing said movable electrode to contact with said cathode upon connection of the device to the supply, said means being in turn deënergized upon the contact of said auxiliary electrode and said cathode.

Signed at New York in the county of New York and State of New York this 16th day of July A. D. 1915.

PERCY H. THOMAS.

Witnesses:
HAROLD B. WOODWARD,
RENÉ WELDON.